United States Patent
Maxwell

(10) Patent No.: US 12,156,505 B2
(45) Date of Patent: Dec. 3, 2024

(54) PET SEAT APPARATUS FOR ATVS

(71) Applicant: Ricky George Maxwell, Vernal, UT (US)

(72) Inventor: Ricky George Maxwell, Vernal, UT (US)

( * ) Notice: Subject to any disclaimer, the term of this patent is extended or adjusted under 35 U.S.C. 154(b) by 0 days.

(21) Appl. No.: 17/962,580

(22) Filed: Oct. 10, 2022

(65) Prior Publication Data
US 2023/0413777 A1   Dec. 28, 2023

Related U.S. Application Data

(60) Provisional application No. 63/356,151, filed on Jun. 28, 2022.

(51) Int. Cl.
*A01K 1/02* (2006.01)
*B60N 2/24* (2006.01)

(52) U.S. Cl.
CPC ............. *A01K 1/0272* (2013.01); *B60N 2/24* (2013.01)

(58) Field of Classification Search
CPC ...... A01K 1/0272; A01K 1/0281; B60N 2/24; B60N 2/28; B60N 2/2833; B60N 2002/363; B60N 2/2866; B60N 2/32; B60N 2/36; B60N 2/065; B60R 7/043
USPC ......................... 119/28.5, 482, 496
See application file for complete search history.

(56) References Cited

U.S. PATENT DOCUMENTS

| | | | |
|---|---|---|---|
| 5,487,361 A * | 1/1996 | Dean ..................... | A01K 1/0272 119/28.5 |
| 5,718,191 A * | 2/1998 | O'Donnell .......... | A01K 1/0281 119/771 |
| 5,785,003 A * | 7/1998 | Jacobson ............. | A01K 1/0272 119/28.5 |
| 6,508,511 B1 * | 1/2003 | Kolpin ....................... | B62J 9/26 297/256.16 |
| 6,564,750 B1 * | 5/2003 | Collins ................ | A01K 1/0353 297/254 |
| 7,377,570 B2 * | 5/2008 | Rondeau .................. | B60N 2/24 180/908 |
| 8,091,513 B1 * | 1/2012 | Garcia ................ | A01K 1/0272 119/28.5 |
| 9,237,739 B1 * | 1/2016 | Tomlin ................ | A01K 1/0353 |
| 11,006,612 B2 * | 5/2021 | Ryan ...................... | B60N 3/001 |

(Continued)

FOREIGN PATENT DOCUMENTS

| | | | | |
|---|---|---|---|---|
| KR | 19990038668 U | * | 10/1999 | ............. B60N 3/00 |
| KR | 20010027634 A | * | 4/2001 | ............. B60N 3/04 |
| KR | 102256727 B1 | * | 5/2021 | .......... A01K 1/0272 |

OTHER PUBLICATIONS https://youtu.be/3W1JQgpriQY?si=IrvJ14Fppv8Gnf3f—DIY Dog Seat for our Polaris RZR XP 4 1000, Travis Adventure Projects, Mar. 30, 2020.*

(Continued)

*Primary Examiner* — Peter M Poon
*Assistant Examiner* — Danielle A Clerkley
(74) *Attorney, Agent, or Firm* — Hall Estill Law Firm

(57) ABSTRACT

A pet seat apparatus for an ATV. The pet seat apparatus includes a seat base with at least one customized side to closely fit contours of a part of the ATV. The seat base includes a first support side for supporting a pet in the ATV and a second support side. The pet seat apparatus also includes a support apparatus for holding the seat base at a desire position in the ATV.

12 Claims, 9 Drawing Sheets

(56) References Cited

U.S. PATENT DOCUMENTS

| | | | | |
|---|---|---|---|---|
| 2006/0066122 A1* | 3/2006 | Wiseman | B62J 1/12 | |
| | | | 296/65.01 | |
| 2006/0150922 A1* | 7/2006 | Kroculick | A01K 1/0272 | |
| | | | 119/753 | |
| 2012/0013158 A1* | 1/2012 | Randazzo | A01K 1/0272 | |
| | | | 297/250.1 | |
| 2016/0353708 A1* | 12/2016 | Gonzalez | A01K 1/0272 | |
| 2023/0116298 A1* | 4/2023 | Florea | A01K 1/0103 | |
| | | | 224/543 | |

OTHER PUBLICATIONS https://youtu.be/BRktT7-YA98?si=9IFBDLbgs_qZuAGY—Tusk UTV Seat Cargo Rack Kit | Polaris RZR, Rocky Mountain ATV MC, Nov. 13, 2018.*

* cited by examiner

PET SEAT APPARATUS FOR ATVS

CROSS-REFERENCE TO RELATED APPLICATIONS

The present application is a conversion of U.S. Provisional Application having U.S. Ser. No. 63/356,151, filed Jun. 28, 2022, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a pet seat apparatus for back seats of side by side all-terrain vehicles (ATVs).

2. Description of the Related Art

Some side by side ATVs have a back seat or seats behind the front seats. There are several places around the back seat(s) where a pet's paw or leg could slip down into and potentially cause serious injury to the pet. Examples of problematic spaces include, but are not limited to, the space between the seat and console or between the seat and the door. The space in front of the rear seats can also be problematic for pets should quick stopping of the ATV be necessary.

Accordingly, there is a need for a pet seat apparatus that accounts for these problematic spaces.

SUMMARY OF THE DISCLOSURE

The present disclosure is directed to a pet seat apparatus for an ATV. The pet seat apparatus includes a seat base with at least one customized side to closely fit contours of a part of the ATV. The seat base includes a first support side for supporting a pet in the ATV and a second support side. The pet seat apparatus also includes a support apparatus for holding the seat base at a desire position in the ATV.

DETAILED DESCRIPTION OF THE DISCLOSURE

Figure 1:
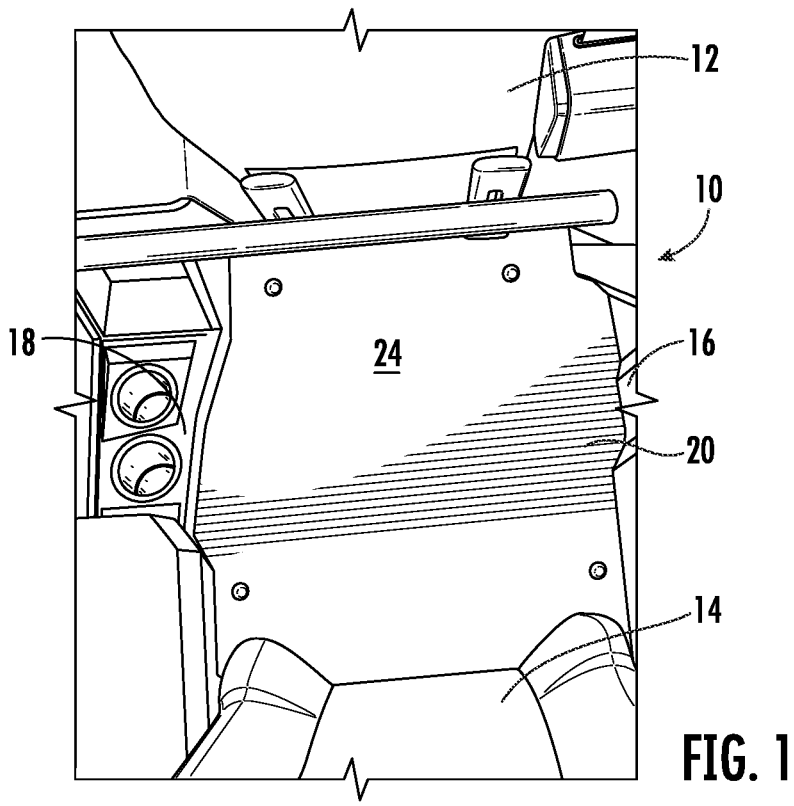
FIG. 1 is a perspective view of a pet seat apparatus for an ATV constructed in accordance with the present disclosure.
Figure 2:
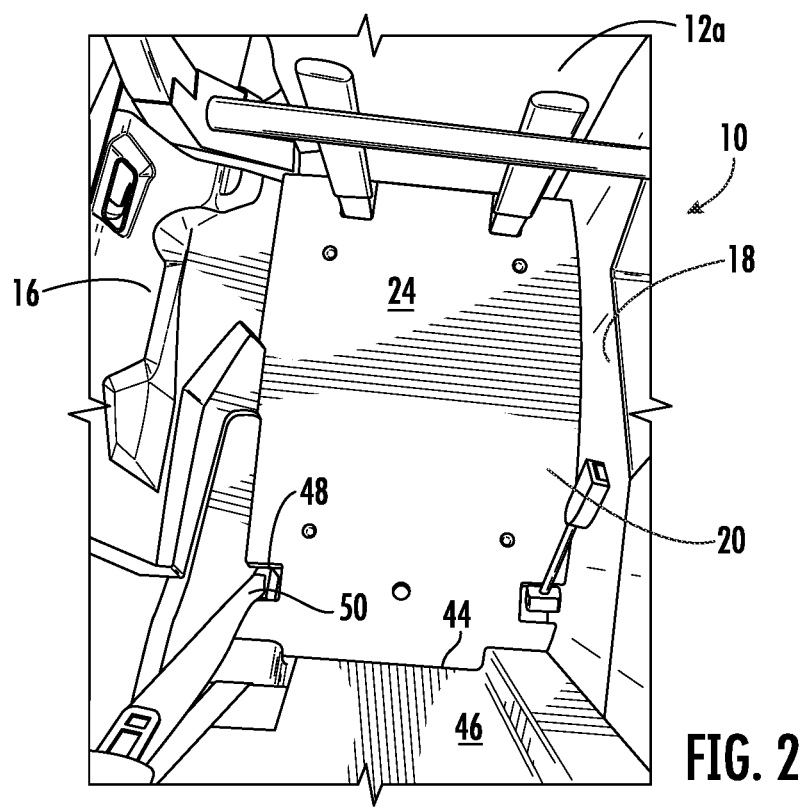
FIG. 2 is a perspective view of another embodiment of a pet seat apparatus for an ATV constructed in accordance with the present disclosure.
Figure 3:
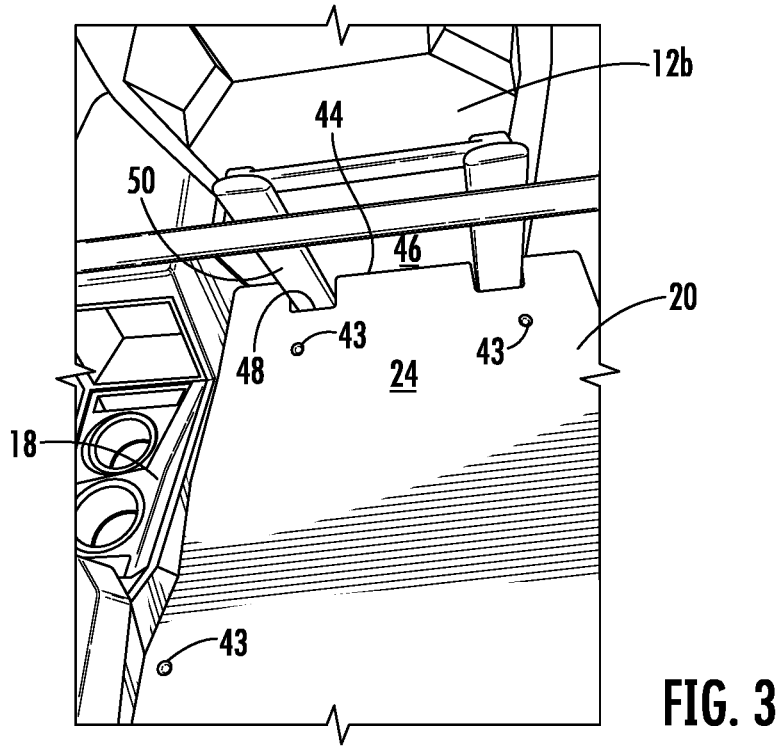
FIG. 3 is another perspective view of the pet seat apparatus constructed in accordance with the present disclosure.
Figure 4:
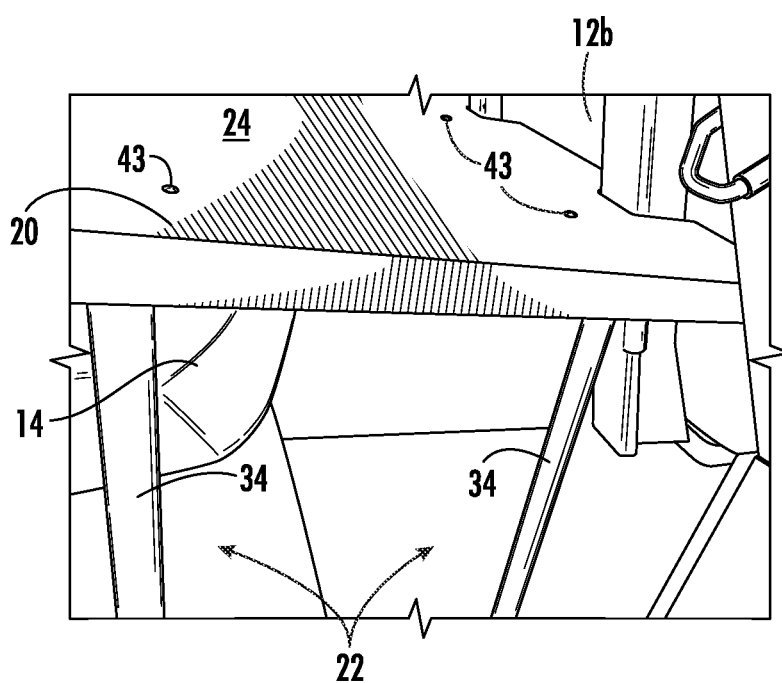
FIG. 4 is another perspective view of the pet seat apparatus constructed in accordance with the present disclosure.
Figure 5:
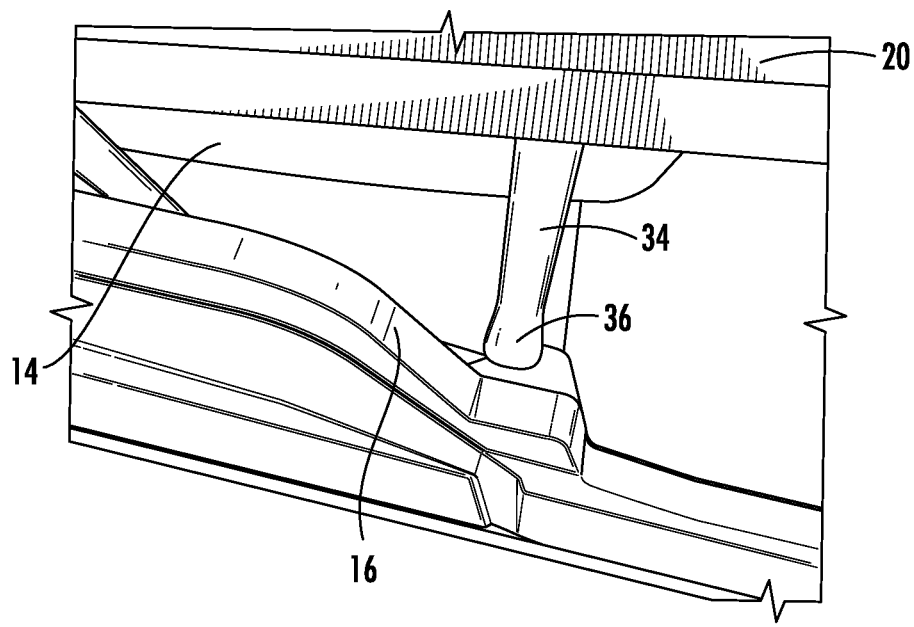
FIG. 5 is another perspective view of the pet seat apparatus constructed in accordance with the present disclosure.

The present disclosure, shown in FIGS. 1-8D, relates to a pet seat apparatus 10 for placement behind the front seat (passenger, driver, or both) 12 of a side by side ATV. The pet seat apparatus 10 can be customized to fit behind the front seat(s) 12 to eliminate (or significantly reduce) problematic spaces that exist adjacent to the back seats 14. Problematic spaces are any spaces that exist adjacent to the back seat(s) 14 where a pet could inadvertently get their paw or leg into, which could lead to potential injury. Some examples of problematic spaces are spaces between the seat 14 and the doors 16, spaces between the seats 14 and a console 18, or spaces between two adjacent seats 14.

The pet seat apparatus 10 includes a seat base 20 and a support apparatus 22. The seat base 20 includes a first support side 24, a second support side 26 with a plurality of customized sides 28. The customized sides 28 are shaped specifically to conform to the shape of the part of the ATV the pet seat apparatus 10 is adjacent to when in place. The first support side 24 is designed to support a pet riding in the back seat area of the ATV. The second support side 26 is designed to engage with the support apparatus 22 that holds the seat base 20 at a desired vertical position. The seat base 20 can be constructed of a single piece of material or made from multiple components wherein some of the components are custom components to the particular model of ATV the pet seat apparatus 10 is going in and some components are standard components that the custom components attach to.

The support apparatus 22 can include any devices or components capable of engaging the seat base 20 and a part of the ATV and maintain the seat base 20 at the desired position. The support apparatus 22 can be constructed of multiple support posts 34 that engage with the second support side 26 of the seat base 20 and various parts of the ATV. The support posts 34 can engage with any part of the ATV (e.g., the floorboard, the base of the ATV adjacent to the seats or console, etc.). The bottoms 36 of the support posts 34 can be connected via base members to provide additional stability to the support apparatus 22. In one embodiment, the support posts 34 can have a wider base portion to increase the stability of the support posts 34. In another embodiment, the support apparatus 22 can include base members and wider base portions to further increase the stability of the support apparatus 22. The top ends 38 of the support posts 34 can engage the second support side 26 of the seat base 20 in any manner known in the art. For example, the top ends 38 of the support posts 34 can have shafts 40 (that can be threaded or unthreaded) extending therefrom that engage in openings 42 (that can be threaded or unthreaded) disposed in the second support side 26 of the seat base 20. In one exemplary embodiment, the top ends 38 of the support posts 34 can have threaded shafts 40 extending therefrom that can frictionally engage threaded openings 42 disposed in the second support side 26 of the seat base 20. In another exemplary embodiment, the top ends 38 of the support posts 34 can have unthreaded shafts 40 extending therefrom that can frictionally engage openings 42 disposed in the second support side 26 of the seat base 20.

Each customized side 28 is designed to confirm to the shape of the parts of the ATV immediately adjacent to the seat base 20. In one embodiment of the present disclosure, one customized side 28 can be the front seat side 28a, one can be the door side 28b, one can be the seat side 28c (this can be the side that is adjacent to one of the back seats 14 or the back of the cab if the back seat 14 is removed) and one can be the console side 28*d*. In this embodiment, the pet seat apparatus 10 is designed to go behind the front driver seat 12*a* or the front passenger seat 12*b*. Each customized side 28 can have as many protrusions 44 on the side 28 as the ATV has recessed areas 46 immediately adjacent to the respective customized side 28. Similarly, each customized side 28 can have as many recessed portions 48 as the ATV has protrusion areas 50 immediately adjacent to the respective customized side 28. The seat base 20 can also include a customized side 28*c* that can engage with the rear seat 14 wherein the rear seat 14 can be all the way back when the pet seat apparatus 10 is put into position. The rear seat 14 can then be slid forward to securely engage the customized side 28*c* of the seat base 20 to provide additional securement of the pet seat apparatus 10 in the rear of the ATV.

Figure 6:
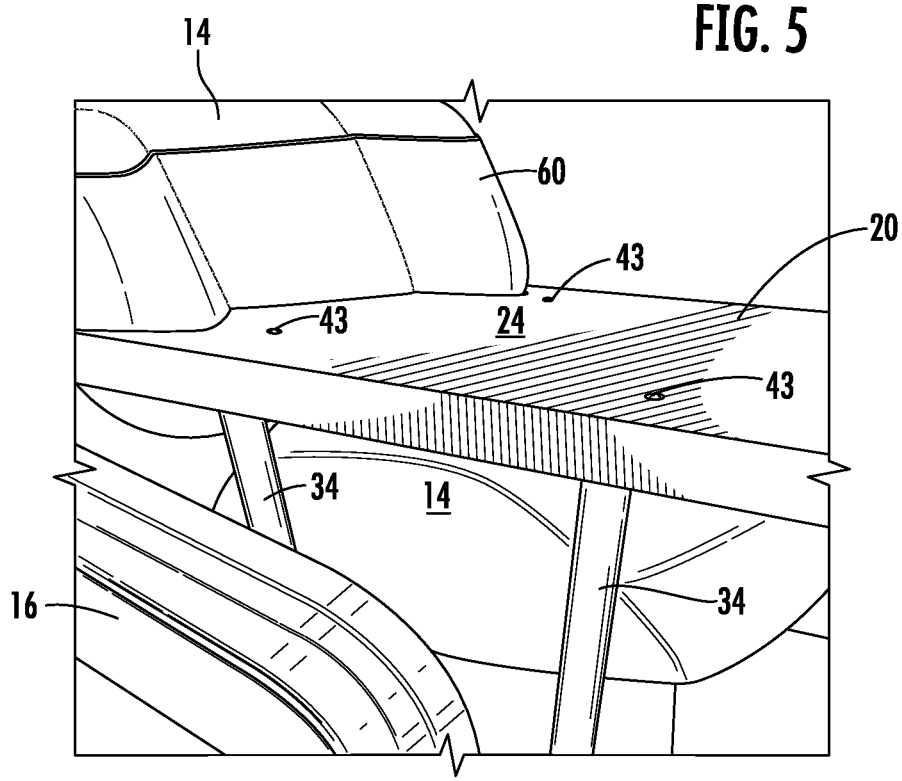
FIG. 6 is another perspective view of the pet seat apparatus constructed in accordance with the present disclosure.
Figure 7A:
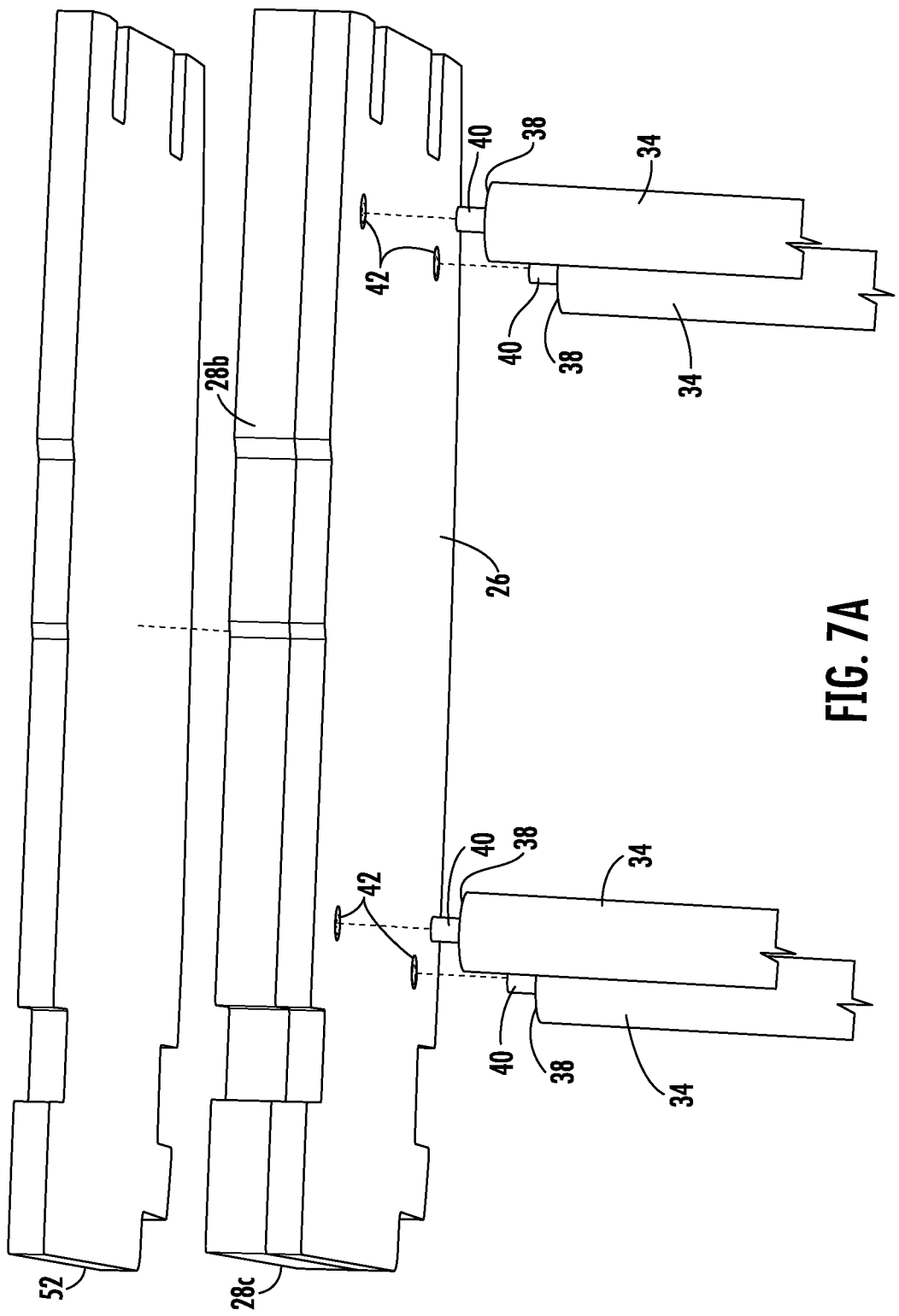
FIG. 7 is an exploded view of the pet seat apparatus constructed in accordance with the present disclosure
Figure 7B:
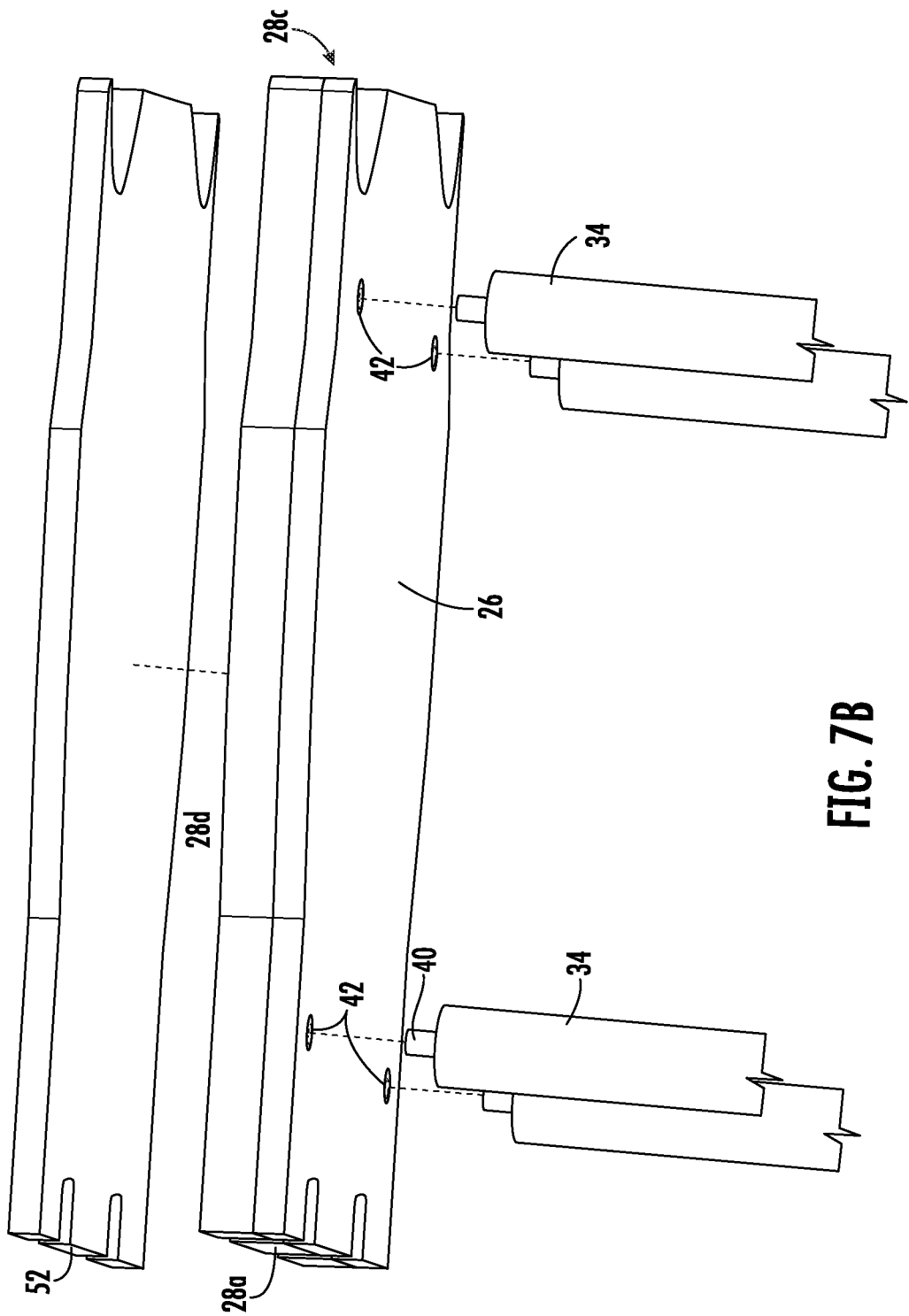
Figure 8A:
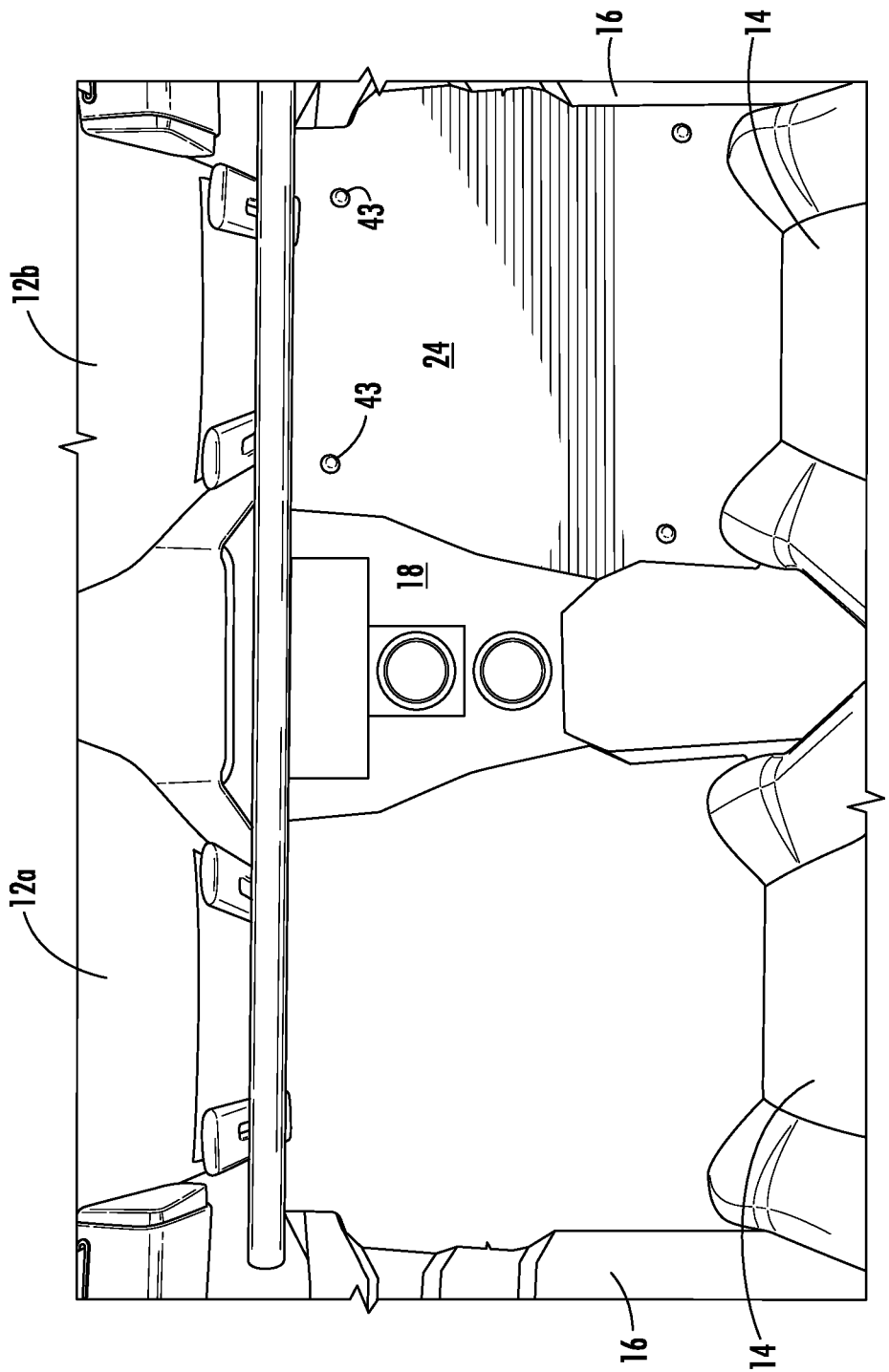
FIGS. 8A-8D are perspective views of various positions of the pet seat apparatus constructed in accordance with the present disclosure.
Figure 8B:
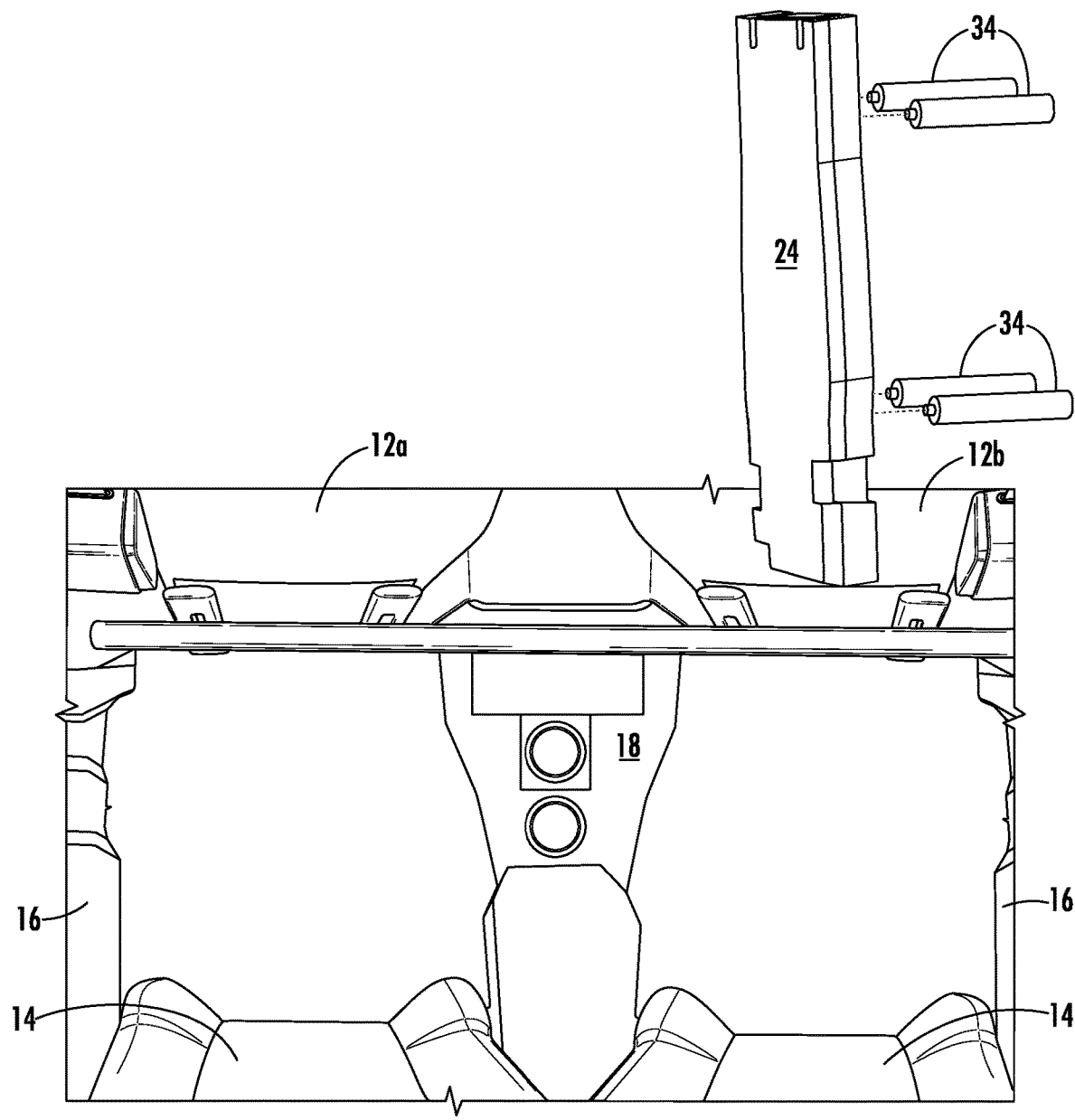
Figure 8C:
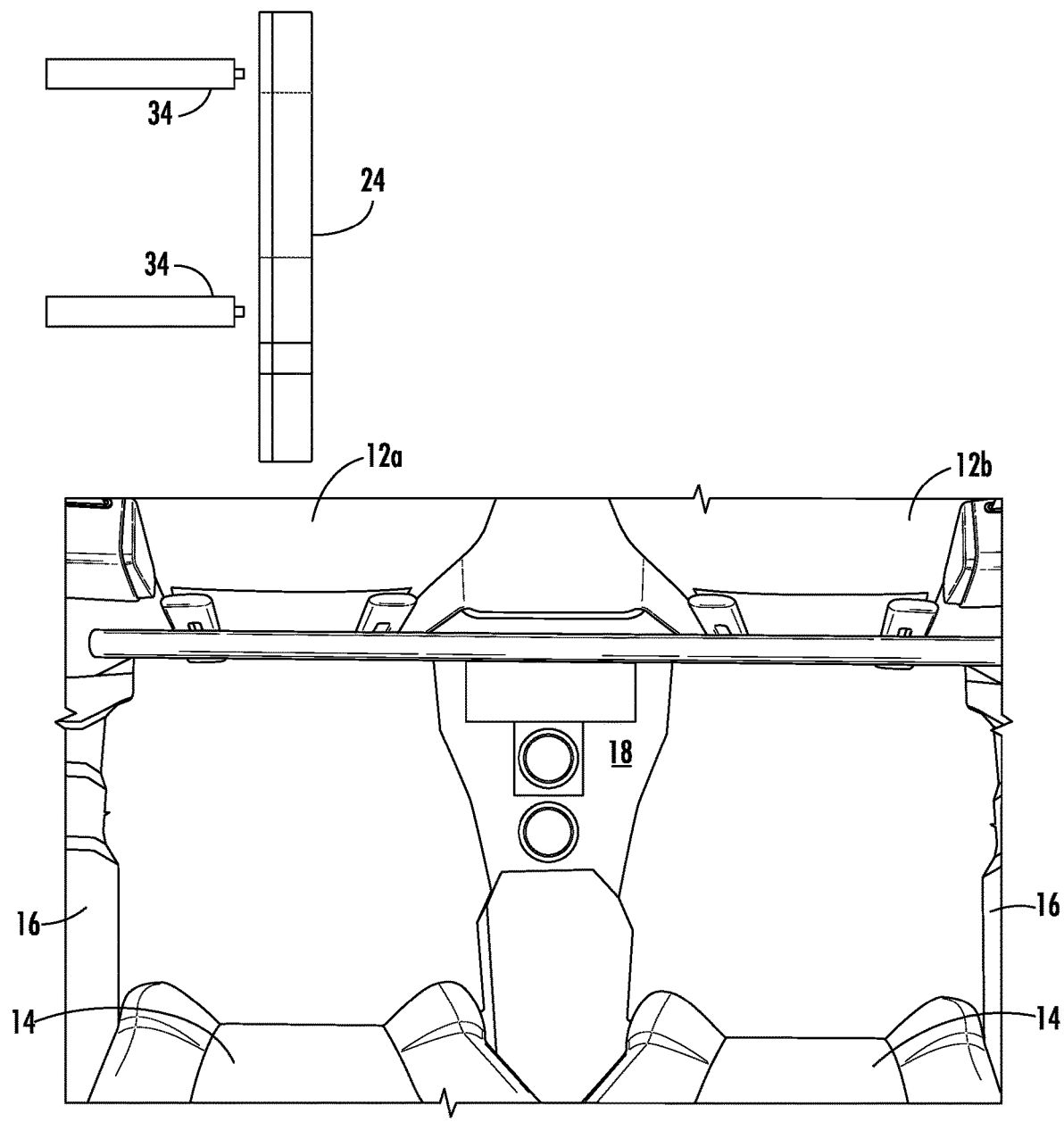
Figure 8D:
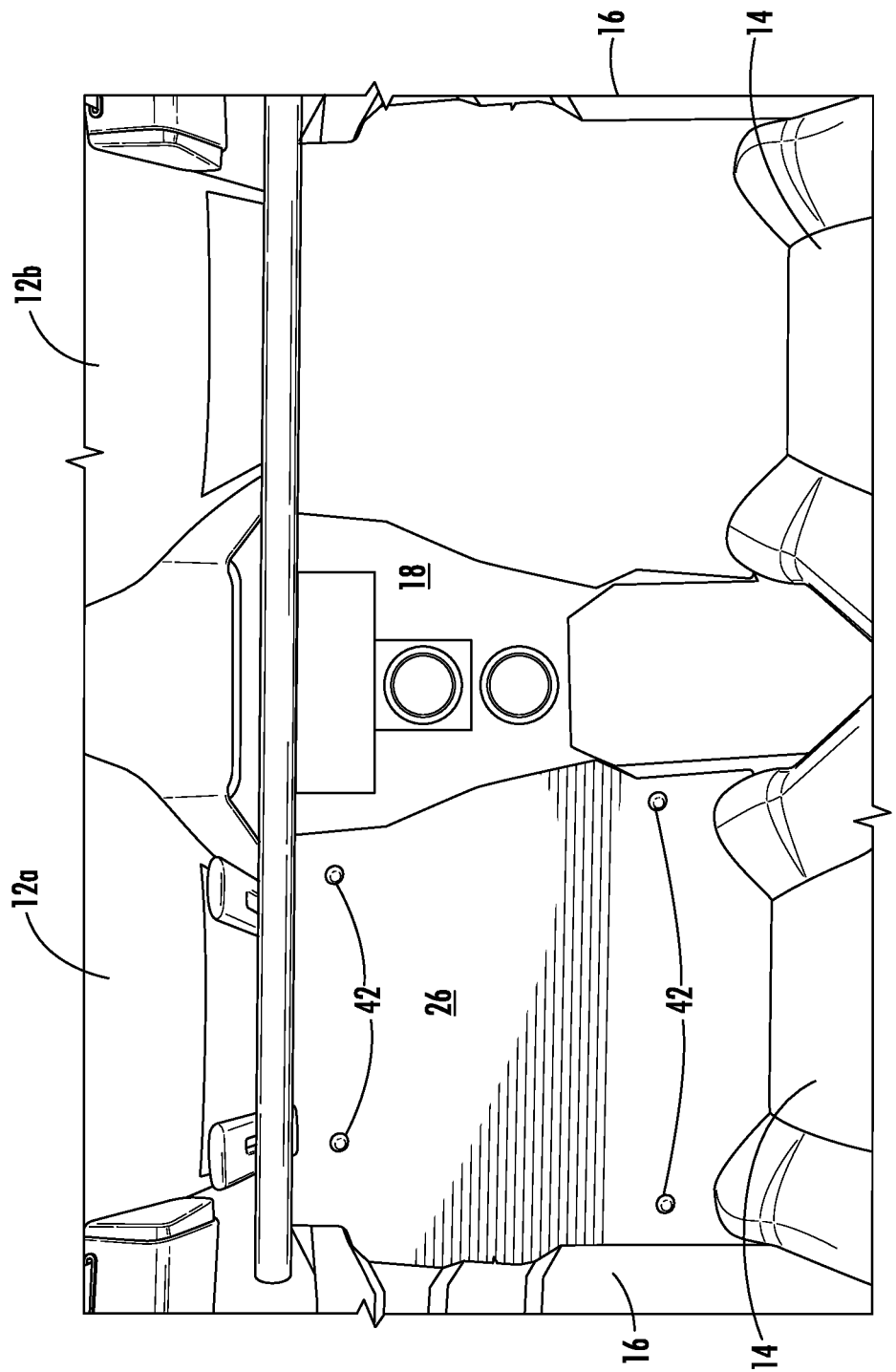

In another embodiment of the present disclosure shown in FIG. 6, the pet seat apparatus 10 can include a safety wall 60 that extends upward from the rear customized side 28*c* of the seat base 20 to prevent the custion of the back seat 14 from giving way and permitting a pet to get their paw caught between the back seat 14 and the seat base 20. The safety wall 60 would be designed such that it conformed to the rear seat 14 and the shape of the customized side 28*c* of the seat base 20. The safety wall 60 can extend directly upward from the seat base 20 or it can extend upward at an angle from the seat base 20.

In another embodiment of the present disclosure, the pet seat apparatus 10 can extend across the whole width of the ATV. In this embodiment, the seat base 20 would be designed to be positioned above the console if there was one. One customized side would conform to the shape of the back passenger door, one customized side would conform to the shape of the back driver side door, one customized side would conform to the shape of the back of both the front and passenger front seats, and one customized side would conform to the rear seats (if they are still in the ATV) and any portion of the rear wall the seat base might be close to. In any embodiment of the present disclosure, the rear seats could be removed and one of the customized sides of the seat base would conform to the shape of the back of the cab of the ATV.

In yet another embodiment of the present disclosure shown in FIGS. 8A-8D, any single pet seat apparatus 10 described or shown herein can be designed to fit behind the front passenger seat 12*b* or the front driver seat 12*a*. In this embodiment, the pet seat apparatus 10 can be designed to go behind the front driver seat 12*a* wherein the first support side 24 of the seat base 20 supports the pet and the second support side 26 engages with the support apparatus 22 to hold the pet seat apparatus 10 in the desired position. This same pet seat apparatus 10 can have the support apparatus 22 removed and the seat base 20 can be rotated about a centerline that splits the driver seats 12*a* and the passenger seats 12*b*. When the seat base 20 is transitioned from its first position behind the front driver seat 12*a* to its second position behind the front passenger seat 12*b*, the second support side 26 becomes the side of the seat base 20 that supports the pet and the first support side 24 becomes the side of the seat base 20 that engages the support apparatus 22. The first support side 24 can have openings 43 (threaded or not) disposed therein to engage the top ends 38 of the support posts 34.

The pet seat apparatus 10 can also include a pad 52 that sits atop the seat base 20 for comfort of the animal. In one embodiment, the pad 52 could be built into the seat base 20. The pet seat apparatus 10 can also include a protective layer (not shown) that covers the pad 52 to protect it from moisture and wear and tear from the pet.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A pet seat apparatus for a side-by-side ATV, the pet seat apparatus comprising:
   a seat base having a first support side for supporting a pet in the ATV and a second support side, the seat base comprises:
      a first side configured to extend immediately adjacent to a front side of a backrest of a back seat of the ATV, the first side extends from the first support side to the second support side, the first side includes a first U-shaped cutout portion to receive a first lateral cushion portion of the back seat and a second U-shaped cutout portion to receive a second lateral cushion portion of the back seat;
      a second side configured to extend immediately adjacent to a back side of a front seat of the ATV, the second side including at least one cutout portion cut in the direction towards the first side of the seat base wherein the cutout portion extends entirely through the seat base from the first support side to the second support side, the second side free of any structure extending from the first support side of the seat base, the immediately adjacent placement of the first and second sides of the seat base and the cutout portions in the first side and second side cooperate to limit the space between the first side and the front side of the backrest of the back seat of the ATV and limit the space between the second side of the seat base and the back of the front seat of the ATV to prevent a pet's paw from being able to pass between the seat base and the front and back seats of the ATV; and
   a support apparatus for holding the seat base at a desired position relative to a floorboard in the ATV, the support apparatus extends from the second support side; and
   wherein the pet seat apparatus is positionable behind the driver side front seat, the support apparatus is removable from the second support side, and the seat base is flippable to be positionable behind the passenger side front seat, and the support apparatus is engageable to the first support side to maintain the seat base at a desired position relative to the floorboard behind the passenger side front seat.

2. The pet seat apparatus of claim 1 wherein the support apparatus includes multiple support posts extending from the second support side of the pet seat apparatus.

3. The pet seat apparatus of claim 2 wherein the support posts include a shaft extending from top portions thereof to engage openings disposed on the second support side.

4. The pet seat apparatus of claim 1 further comprising a pad to set atop the seat base to provide comfort to the pet.

5. The pet seat apparatus of claim 1 wherein the support apparatus includes support posts with shafts extending therefrom that engage openings in the second support side of the seat base.

6. The pet seat apparatus of claim 1 wherein the pet seat apparatus includes a safety wall extending upward from the first side of the seat base to prevent a pet's paw from getting caught between the back rest of the back seat of the ATV and the seat base.

7. A pet seat apparatus for a side-by-side ATV, the pet seat apparatus comprising:
   a seat base having a first support side for supporting a pet in the ATV and a second support side, the seat base comprises:
   a first side configured to extend immediately adjacent to a backside of a cabin of the ATV;
   a second side configured to extend immediately adjacent to a back side of a front seat of the ATV, the second side including at least one cutout portion cut in the direction towards the first side of the seat base wherein the cutout portion extends entirely through the seat base from the first support side to the second support side, the second side free of any structure extending from the first support side of the seat base, the immediately adjacent placement of the first and second sides of the seat base and the cutout portions in the first side and second side cooperate to limit the space between the first side and the front side of the backrest of the back seat of the ATV and limit the space between the second side of the seat base and the back of the front seat of the ATV to prevent a pet's paw from being able to pass between the seat base and the front and back seats of the ATV;
   a third side configured to extend immediately adjacent to an inside part of a back door of the ATV, the third side having a cutout portion;
   a fourth side configured to extend immediately adjacent to a center console of the ATV, the fourth side having an opposing cutout portion; and
   a support apparatus for holding the seat base at a desired position relative to a floorboard in the ATV, the support apparatus extends from the second support side; and
   wherein the pet seat apparatus is positionable behind the driver side front seat, the support apparatus is removable from the second support side, and the seat base is flippable to be positionable behind the passenger side front seat, and the support apparatus is engageable to the first support side to maintain the seat base at a desired position relative to the floorboard behind the passenger side front seat.

8. The pet seat apparatus of claim 7 wherein the support apparatus includes multiple support posts extending from the second support side of the pet seat apparatus.

9. The pet seat apparatus of claim 8 wherein the support posts include a shaft extending from top portions thereof to engage openings disposed on the second support side.

10. The pet seat apparatus of claim 7 further comprising a pad to set atop the seat base to provide comfort to the pet.

11. The pet seat apparatus of claim 7 wherein the support apparatus includes support posts with shafts extending therefrom that engage openings in the second support side of the seat base.

12. The pet seat apparatus of claim 7 wherein the pet seat apparatus includes a safety wall extending upward from the first side of the seat base to prevent a pet's paw from getting caught between the back rest of the back seat of the ATV and the seat base.

* * * * *